(12) United States Patent
Sheth et al.

(10) Patent No.: US 8,053,919 B1
(45) Date of Patent: Nov. 8, 2011

(54) WIND TURBINE POWER GENERATOR

(76) Inventors: Himanshu Sheth, Houston, TX (US);
Prayank Sheth, Houston, TX (US);
Janak Sheth, Houston, TX (US)

( * ) Notice: Subject to any disclaimer, the term of this patent is extended or adjusted under 35 U.S.C. 154(b) by 516 days.

(21) Appl. No.: 12/332,336

(22) Filed: Dec. 10, 2008

Related U.S. Application Data (60) Provisional application No. 61/057,839, filed on May 31, 2008.

(51) Int. Cl.
*F03D 5/04* (2006.01)

(52) U.S. Cl. ......................................................... 290/55

(58) Field of Classification Search .................. 290/44, 290/54, 55; 415/2.1, 4.2–4.5, 7; 416/132 B, 416/1, 7; 60/398
See application file for complete search history.

(56) References Cited

U.S. PATENT DOCUMENTS

| | | | |
|---|---|---|---|
| 1,183,219 A * | 5/1916 | Manikowske | 290/44 |
| 4,031,405 A * | 6/1977 | Asperger | 290/55 |
| 4,350,895 A | 9/1982 | Cook | |
| 4,729,716 A | 3/1988 | Schmidt | |
| 5,591,004 A | 1/1997 | Aylor | |
| 5,632,599 A | 5/1997 | Townsend | |
| 5,743,712 A | 4/1998 | Aylor | |
| 5,863,180 A | 1/1999 | Townsend | |
| 6,417,578 B1 | 7/2002 | Chapman et al. | |
| 7,215,037 B2 * | 5/2007 | Scalzi | 290/55 |
| 2006/0275121 A1 | 12/2006 | Merswolke et al. | |

* cited by examiner

*Primary Examiner* — Dang D Le
(74) *Attorney, Agent, or Firm* — Kenneth A. Roddy

(57) ABSTRACT

A wind turbine having a large circular rotor wheel formed of concentric inner and outer rings with adjustable elliptical blades extending therebetween. The inner and outer rings are rotatably supported in a vertical plane to rotate about a horizontal axis by circumferential arcuate bearing supports connected by support arms to yaw mechanisms on a support tower which pivot about a vertical axis, and the outer ring is partially supported on the top of a horizontal rotatable revolving track which revolves around the tower and drives power wheels that operate water pumps, air pumps, and/or or electrical generators. A load shedding mechanism allows the power wheels to be selectively engaged or disengaged from the pump or generator load depending upon the available wind power to maintain rotation of the circular rotor wheel and horizontal rotatable revolving track without the load.

10 Claims, 6 Drawing Sheets

Front View

Front View

*Fig. 1*

Fig. 2  Side view

WIND TURBINE POWER GENERATOR

CROSS REFERENCE TO RELATED APPLICATION

This application claims priority of U.S. Provisional Patent Application Ser. No. 61/057,839, filed May 31, 2008.

BACKGROUND OF THE INVENTION

1. Field of the Invention

This invention relates generally to wind turbines and methods of operation thereof for producing energy and, more particularly to a wind turbine having a circular rotor wheel formed of concentric inner and outer rings with adjustable elliptical blades extending therebetween, the inner and outer rings supported by circumferential arcuate bearing supports connected to yaw mechanisms on a support tower, and the outer ring partially supported on a horizontal rotatable track which rotates to drive power wheels that operate water pumps, air pumps, and/or electrical generators which are selectively engaged or disengaged depending upon the available wind power to maintain rotation of the circular rotor wheel.

2. Background Art

Cook, U.S. Pat. No. 4,350,895 discloses a wind turbine for generation of electricity comprising a large, lightweight wheel attached to a fixed vertical central pylori and oriented to rotate in a vertical plane around a boom having an axis that is substantially horizontal, and pivoted at one end to the pylori. The wind wheel is supported at its rim by a carriage assembly that is constrained to move in a circular horizontal path about the central pylori. The wheel has a cylindrical outer rim and may include one or more perimeter frame structures. The outer surface of the rim is essentially flat in cross section and presents a traction surface for the takeoff of energy from the rim of the wheel. The wheel has a plurality of uniformly spaced radial spindles on which are rolled sails (soft airfoils), which when unfurled catch the wind to provide the rotational motion to the wheel. The carriage assembly may be moved around the pylori by driver means to accommodate for changes in wind direction, or the wind wheel as a whole can be allowed to move freely to assume the preferred wind direction in the manner of a weather vane. The wheel and frame structure are secured to and supports the horizontal boom which lies colinear with the axis of the wheel and projects longitudinally in both directions from the central plane of the wheel. The entire boom structure is supported by means of stays from the perimeter of the rim to the ends of the boom.

Schmidt, U.S. Pat. No. 4,729,716 discloses a wind turbine having a circular turbine wheel with a plurality of soft, furlable and unfurlable airfoils depending between a rim and hub. Each airfoil has associated with it a stepping motor for selectively furling and unfurling the airfoils. The turbine wheel is supported on a carriage which is in turn supported in a cantilevered manner from a central anchor which allows for revolving of the carriage, and therefore the turbine wheel, about the anchor. Control is provided for rotating the turbine wheel into a position upwind and normal to the wind direction. An upstanding pylori mounted on the anchor maintains the turbine wheel in an upright position. The pylori allows for revolving and rotating of the turbine wheel. It also provides for pivoting of the turbine wheel about a generally horizontal axis parallel to and spaced from the plane of the turbine wheel. A plurality of generators are driven by power take-off wheels mounted on the carriage which directly support the turbine wheel rim. Turbine wheel rotational speed control is maintained by varying the number of generators driven by the power take-off wheels and by furling and unfurling the airfoils.

Merswolke, U.S. Published Application No. 2006/0275121 discloses a wind turbine with friction drive power take off on outer rim. The wind turbine has multiple blades that are mounted on a shaft with a ring around a circumference of the blades and tires that are arranged to be in contact or out of contact with the ring. The tires draw generators when the tires are in contact with the ring and the ring is rotating. A controller monitors the wind conditions and controls the turbine to produce electricity or other-energy output or to shut down if the wind falls below a predetermined level.

U.S. Pat. Nos. 5,591,004, 5,632,599, 5,743,712, 5,863,180, and 6,417,578 disclose fluid energy converter wind turbines having a squirrel-cage-like rotor in which blades peripherally distributed about a horizontal axis of rotation are in a plane generally parallel to the axis of rotation. An entry at one end of the rotor is arranged to face the oncoming fluid (air) for receipt thereof. The predominantly axial flow of fluid (air) from the entry is redirected outwardly to the peripherally distributed blades and through the slots therebetween.

SUMMARY OF THE INVENTION

The present invention is distinguished over the prior art in general, and these patents in particular, by a wind turbine power generator having a large circular rotor wheel assembly formed of concentric inner and outer rings with a plurality of adjustable elliptical blades extending therebetween. The inner and outer rings are rotatably supported in a vertical plane to rotate about a horizontal axis by circumferential arcuate bearing supports connected by support arms to yaw mechanisms on a support tower which pivot about a vertical axis, and the outer ring is partially supported on the top of a horizontal rotatable revolving track which revolves around the tower and drives power wheels that operate water pumps, air pumps, and/or or electrical generators. A load shedding mechanism allows the power wheels to be selectively engaged or disengaged from the pump or generator load depending upon the available wind power to maintain rotation of the circular rotor wheel and horizontal rotatable revolving track without the load.

DESCRIPTION OF THE PREFERRED EMBODIMENT

Referring now to the drawings by numerals of reference, in FIGS. 1 through 6, there is shown, somewhat schematically, a wind turbine power generator 10 in accordance with a preferred embodiment of the present invention. The major components and their relationship will be briefly described first, followed by a more detailed description. The major components of the wind turbine power generator 10 include a large circular rotor wheel assembly 11 formed of an inner circular ring 11A and an outer circular ring 11B disposed in concentric spaced relation with a plurality of adjustable elliptical blades 12 extending therebetween. The inner and outer rings 11A and 11B are rotatably supported in a vertical plane to rotate about a horizontal axis by circumferential arcuate bearing supports 14 connected by rotor support arms 15 to yaw mechanisms 16 mounted on a support tower 17 which pivot about a vertical axis, and the outer ring 11B is partially supported on the top of a horizontal rotatable revolving track 20 which revolves around the tower 17 and drives power wheels 21 that operate water pumps, air pumps, and/or electrical generators (P,G) or alternators. As shown somewhat schematically in FIG. 4, a load shedding mechanism 22 connected between the power wheels 21 and a pump P or generator G, allows the power wheels to be selectively engaged or disengaged from the pump or generator load depending upon the available wind power to maintain rotation of the circular rotor wheel assembly 11 and horizontal rotatable revolving track 20 without the load.

Figure 1:
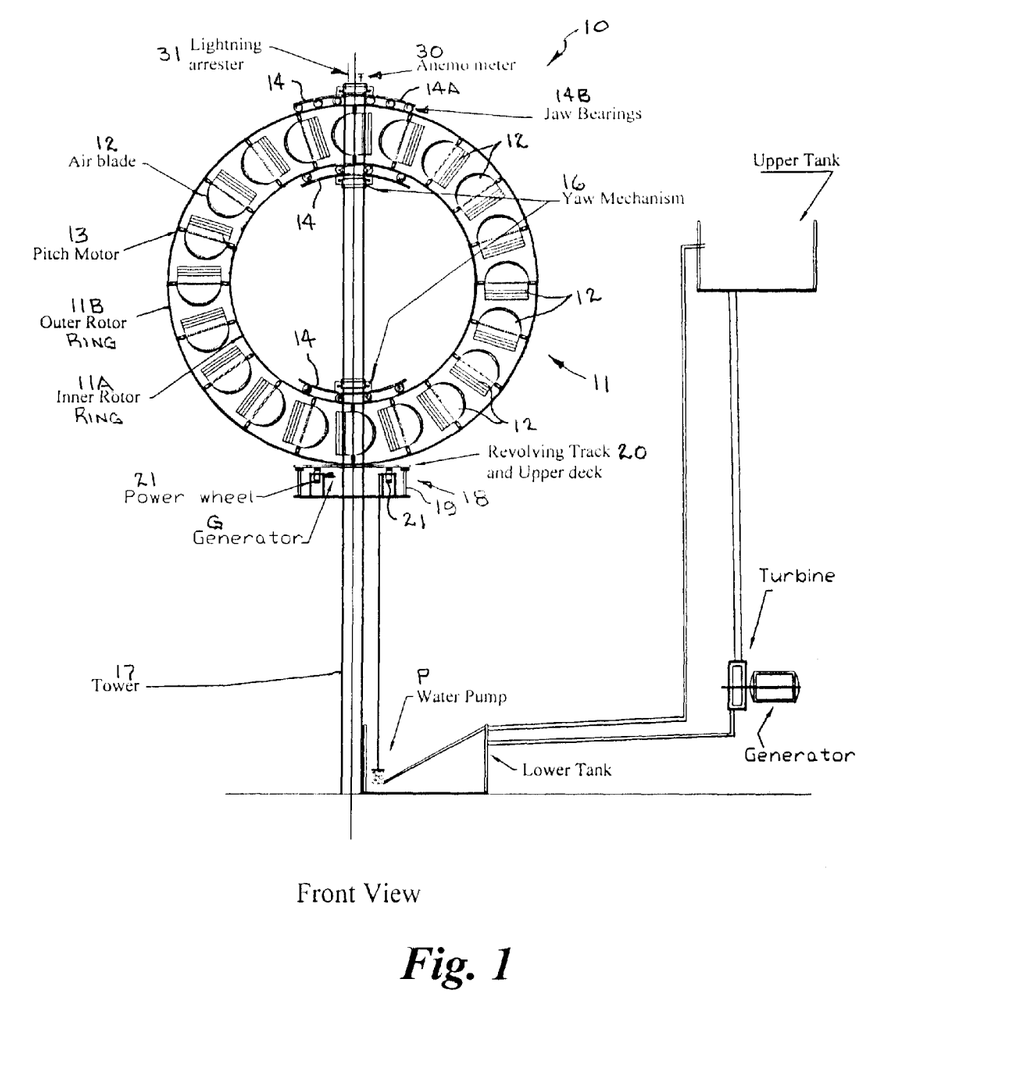
FIG. 1 is a front elevation view, showing somewhat schematically, the wind turbine power generator in accordance with the present invention.

The inner and outer circular rings 11A and 11B of the rotor wheel assembly 11 may be formed of PVC, Nylon, or other suitable material and are of sufficient diameter and wall thickness to withstand weight of the blades 12 and wind forces. The inner and outer circular rings 11A and 11B of the rotor wheel assembly 11 may be fabricated in arcuate sections assembled to form the circular rings. The inner and outer circular rings 11A and 11B of the rotor wheel assembly 11 may also be fabricated of two or more tubes and/or other filler material to give strength, or one large tube may contain number of smaller tubes inside. Although two rings 11A and 11B are shown in the illustrated example, it should be understood that the rotor wheel assembly 11 may be formed of more than two circular rings disposed in concentric spaced relation with a plurality of adjustable elliptical blades 12 extending therebetween to support more blades and/or more weight, as described hereinafter.

The adjustable elliptical blades 12 that extend between the inner and outer circular rings 11A and 11B of the rotor wheel assembly 11 are formed of lightweight PVC, Nylon, fiberglass or other suitable lightweight material and are configured in the shape of a saucer or elliptical flap. The blades 12 are supported between the inner and outer rings 11A and 11B by pitch motor mechanisms 13 or servo motors which may rotate the blades so as to change the angle of attack relative to the wind direction. Each blade 12 may be controlled by an individual pitch motor mechanism 13 or groups of blades may be controlled by a group pitch motor mechanism.

Figure 7:
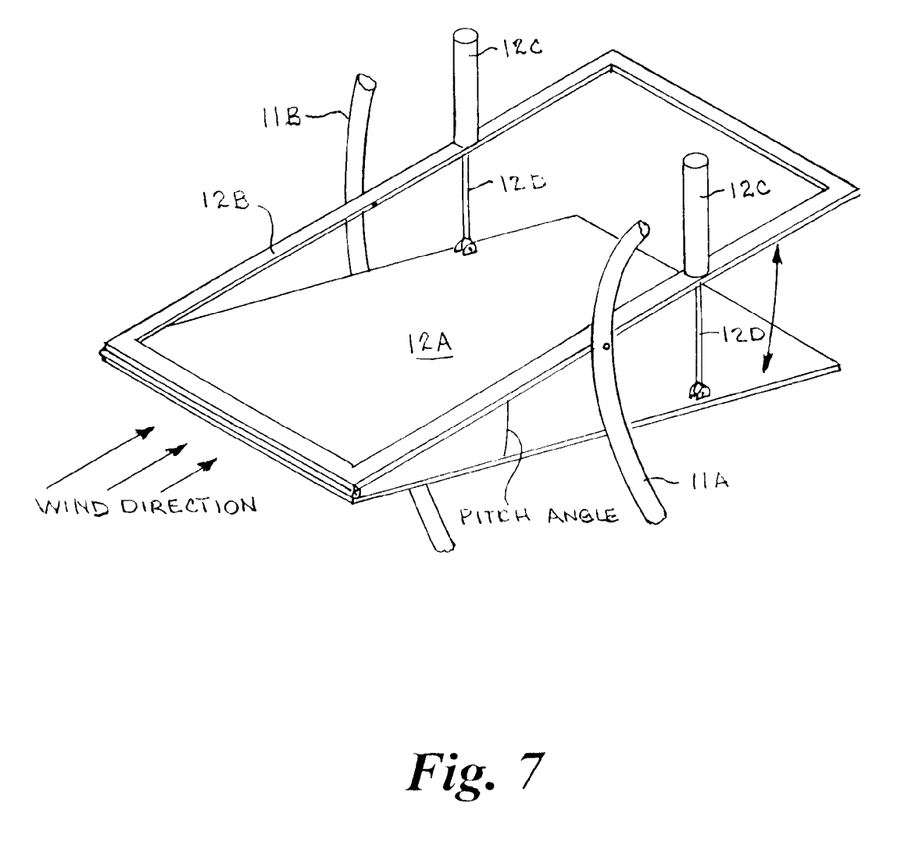
FIG. 7 is a partial perspective view showing, somewhat schematically, an alternate blade and wind pitch control mechanism.

FIG. 7 shows an alternate blade and self activated pitch control mechanism. In this arrangement, the blade 12A is a generally rectangular blade that is pivotally connected at its forward end to the forward end of a generally rectangular open mounting frame 12B. The opposed sides of the mounting frame 12B intermediate its forward and rearward ends are fixed to the inner and outer rings 11A and 11B of the rotor wheel assembly 11 such that the frame is disposed horizontally in line with the wind flow direction. The rear portion of the blade 12A is supported beneath the frame 12B by a pair of spring biased cylinder mechanisms 12C secured to each side of the frame. The spring biased cylinder mechanisms 12C have an internal compression spring engaged on a depending piston rod 12D connected to the sides of the blade such that the blade can pivot through a pitch angle relative to the frame against the spring force of the spring biased cylinder mechanisms. The spring force of the spring biased cylinder mechanisms 12C is calibrated to bias the blade 12A downward to a maximum pitch angle when there is no wind, and to allow the spring to compress and the blade to pivot upwardly to reduce the pitch angle corresponding to the wind force. Thus, the pitch angle of the blade 12A changes relative to the wind force. The spring biased cylinder mechanisms 12C may also be provided with a metering valve and pneumatic or hydraulic damping system such that the blade 12A will respond immediately to an increasing wind force but will have a time delayed response to a decreasing wind force. Such pneumatic and hydraulic cylinder mechanisms are conventional in the art, and therefore not shown in detail, for example the type used in the automotive field to control opening and closing of a vehicle hatchback.

Figure 5:
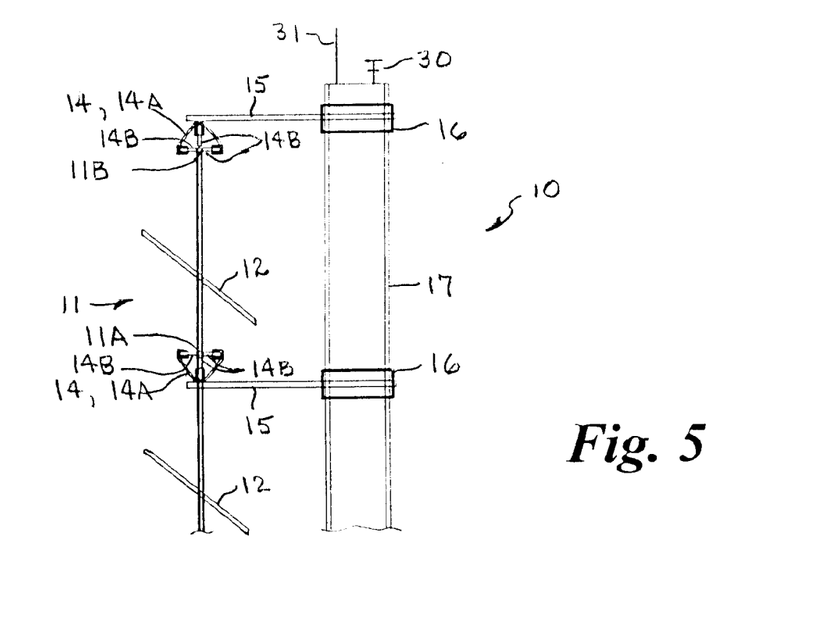
FIG. 5 is an enlarged cross sectional view showing an upper portion of the rotor wheel assembly from the side supported on the arcuate bearing supports connected by support arms to yaw mechanisms on the support tower
Figure 6:
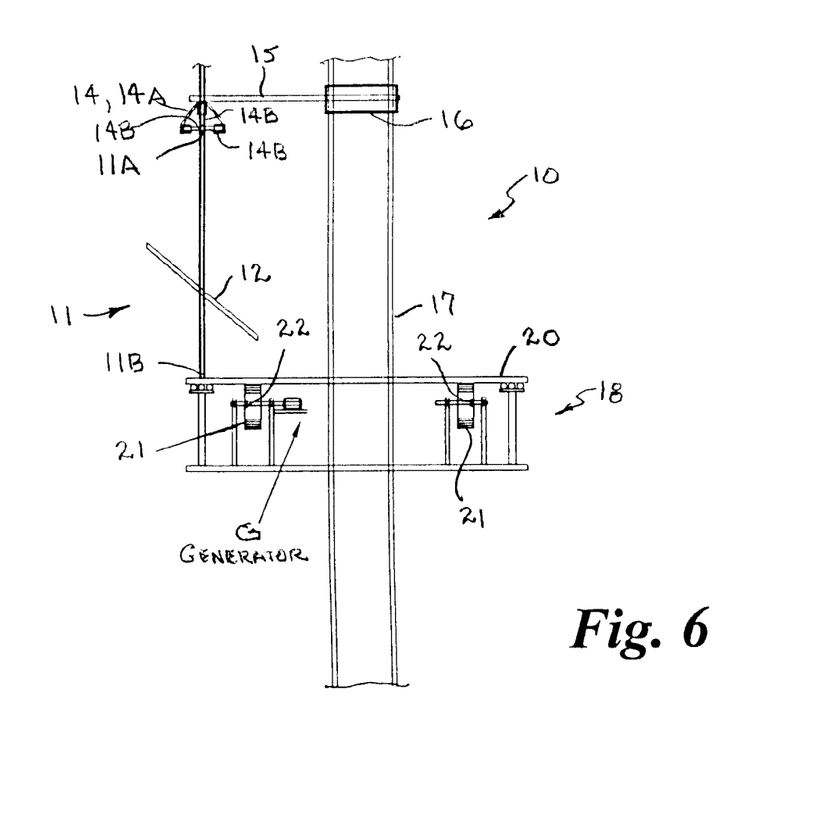
FIG. 6 is an enlarged cross sectional view showing a lower portion of the rotor wheel assembly from the side supported on the rotatable revolving track.

The circumferential arcuate bearing supports 14 that support the inner and outer rings 11A and 11B are formed of arcuate segments 14A that are radially spaced from the inner and outer rings and contain a plurality of circumferentially spaced sets of jaw bearings 14B. Each set of jaw bearings 14B has bearing members 14C that engage the circumference and lateral sides of the inner and outer rings 11A and 11B to rotatably support the rings in a vertical plane. In the illustrated example, the inner ring 11A is supported on a pair of arcuate bearing supports 14 disposed in vertically opposed relation, and a top segment of the outer ring 11B is supported by a third arcuate bearing support 14. A vertically opposed bottom segment of the outer ring 11B is supported on the horizontal rotatable revolving track 20, as described hereinafter.

Figure 2:
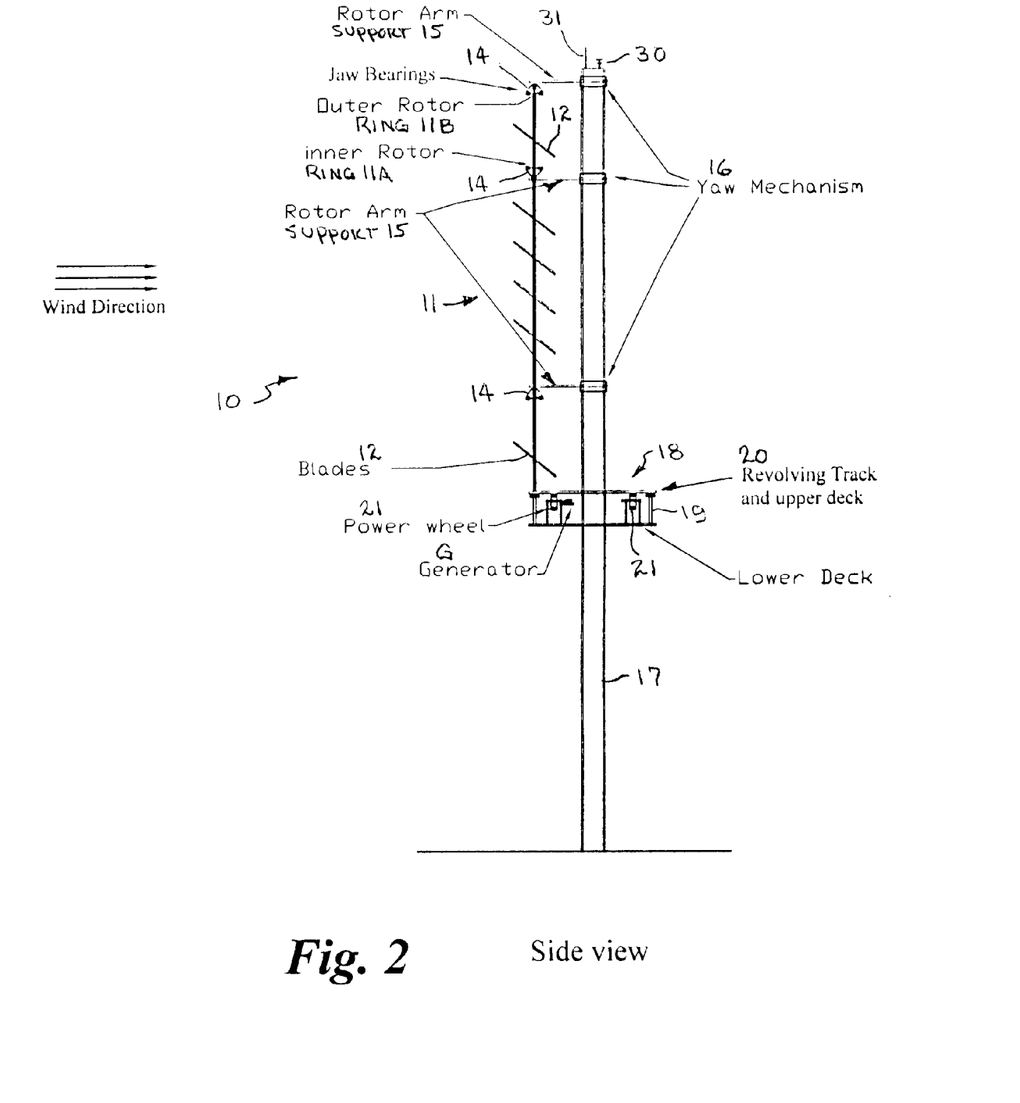
FIG. 2 is a side elevation view of the wind turbine power generator of FIG. 1.
Figure 3:
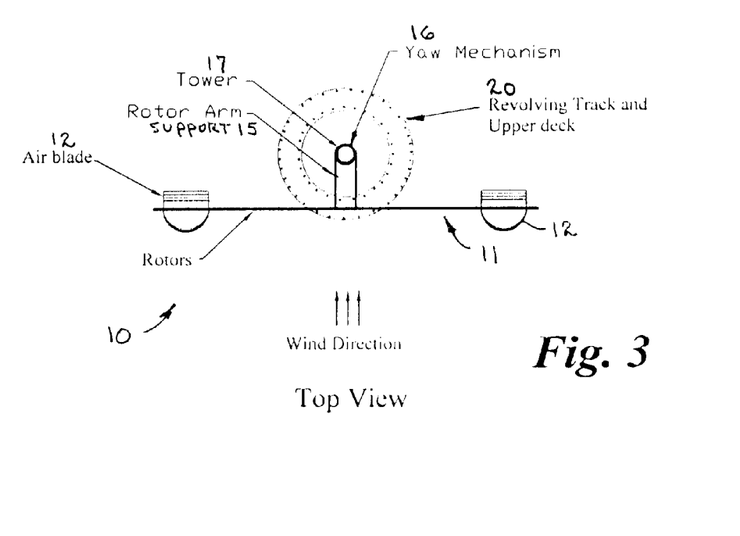
FIG. 3 is a top plan view of the wind turbine power generator of FIG. 1.

The arcuate bearing supports 14 are supported in vertically spaced relation by the rotor support arms 15 that are connected to respective yaw mechanisms 16 that are mounted on the support tower 17. The yaw mechanisms 16 include a motor, bearings, a brake and hold mechanism, and associated circuitry controlled by a signal generated by an anemometer 30 mounted at the top of the tower 17 that includes both wind speed and wind direction sensors to selectively allow the rotor wheel assembly 11 to pivot about a vertical axis to face upwind, or to prevent rotation about the vertical axis. A lightning arrestor 31 is also mounted on the top of the support tower 17.

Figure 4:
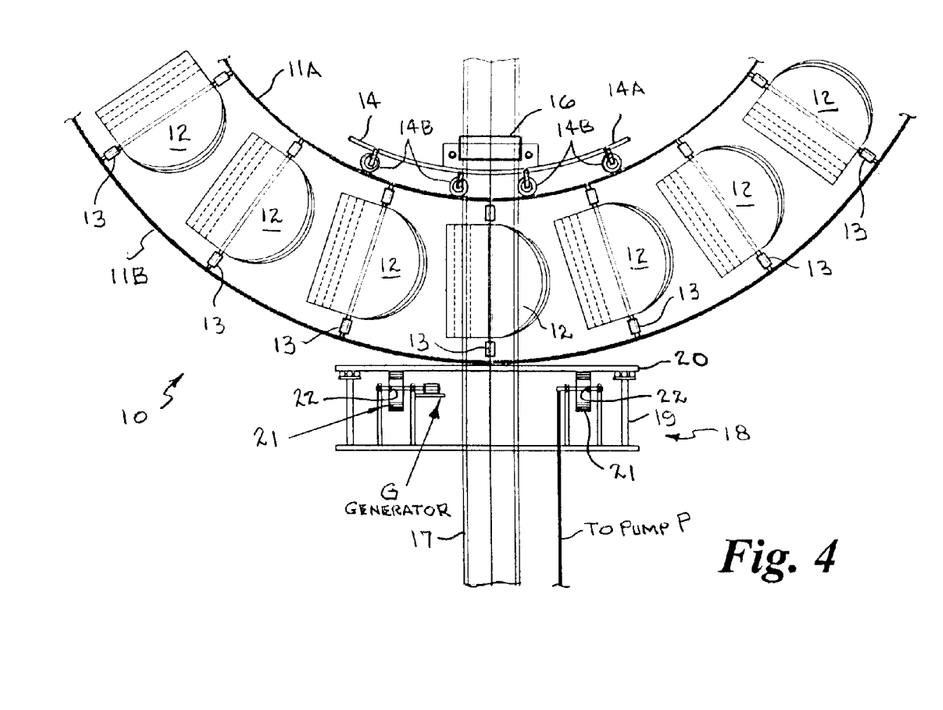
FIG. 4 is an enlarged cross sectional view showing a lower portion of the rotor wheel assembly supported on the rotatable revolving track.

A nacelle 18 is mounted on the tower 19 beneath the rotor wheel assembly 11. The nacelle 18 has a housing 19 that encircles the tower and has a bottom wall, a side wall, and the horizontal rotatable revolving track 20 forms at least a portion of a top wall of the nacelle. The nacelle 18 contains the power wheels 21, and electrical generator G or battery charging alternator, and microprocessor(s) and associated circuitry and controllers, etc., for controlling the operation of wind power generator. The power wheels 21 may also be operatively connected with water or air pumps P.

As described above, a bottom segment of the outer ring 11B is supported on the top of the horizontal rotatable revolving track 20, which revolves around the tower 17 and drives the power wheels 21 that operate the electrical generator G or alternator in the nacelle 18 and/or the water or air pumps P. The load shedding mechanism 22 connected between the power wheels 21 and pump P or generator G may be a clutch, solenoid, or other suitable mechanism that allows the power wheels to be selectively engaged or disengaged from the pump or generator load depending upon the available wind power to maintain rotation of the circular rotor wheel assembly 11 and horizontal rotatable revolving track 20 without the load.

One or more parking brake wheels (not shown) similar to the power wheels 21, are housed within the nacelle 18 and are selectively engageable with the horizontal rotatable revolving track 20 to hold it stationary in a parked condition and prevent it from revolving when required, such as when the yaw motor is moving the rotor wheel assembly 11 around the track to face the wind direction, performing maintenance work, or in an emergency situation.

Figure 8:
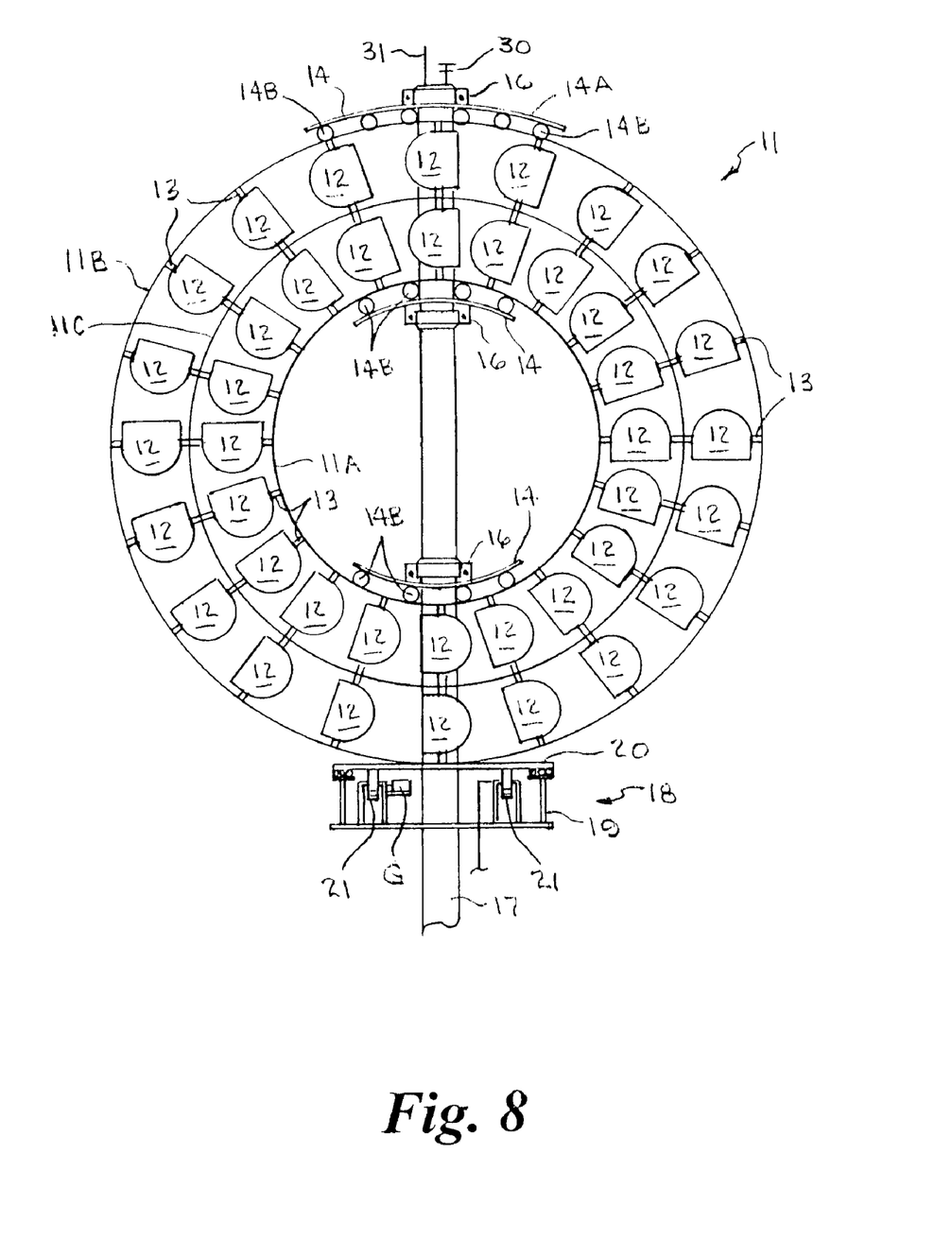
FIG. 8 is a front elevation view, similar to FIG. 1, showing somewhat schematically, a modification of the wind turbine power generator wherein the circular rotor wheel assembly has an inner circular ring, an intermediate circular ring, and an outer circular ring disposed in concentric spaced relation.

FIG. 8 shows, somewhat schematically, a modification of the wind turbine power generator, similar to the embodiment of FIG. 1, wherein the circular rotor wheel assembly has an inner circular ring 11A, an intermediate circular ring 11C, and an outer circular ring 11B disposed in concentric spaced relation with a plurality of adjustable elliptical blades 12 extending therebetween to support more blades and/or more weight. The components that are the same as those previously described with reference to the embodiment of FIG. 1 are assigned the same numerals of reference, but some of the components are not shown and not described again in detail to avoid repetition. As with the previously described embodiment, the inner and outer rings 11A and 11B are rotatably supported and engaged by the jaw bearings 14B of the arcuate bearing supports 14, and the intermediate ring 11C is disposed between the inner and outer rings.

It should be understood that any number of intermediate rings 11C may be disposed in concentric spaced relation between the inner and outer rings 11A and 11B with a plurality of adjustable elliptical blades 12 extending therebetween each set of rings. It should also be understood that this modification may also utilize the alternate generally rectangular blade and self activated pitch control mechanism as shown and described above with reference to FIG. 7.

Operation

Referring again to FIG. 1, the following is an example of the operation of the wind turbine power generator 10 in use in operating a water turbine to produce energy. The wind power generator is commissioned under light wind conditions. There are 6 positions, namely; "FURLING", "PARK", "NO-LOAD", "RUN", "BRAKE", and "EMERGENCY BRAKE".

The initial position is "PARK", wherein the angle of the attack of the air blades 12 is zero. The sequence of operation of the wind power generator is as follows:

1. The wind direction sensor (anemometer 30) senses the wind direction and sends signal to the yaw mechanism 16.
2. The yaw mechanism 16 rotates the rotor wheel assembly 11 to face the wind.
3. The wind speed sensor (anemometer 30) sends a signal to the servo motor 13 that rotates the air blades 12 and changes the angle of attack.
4. The rotor wheel assembly 11 starts turning, and all the wind energy converted is used to accelerate the rotor wheel assembly. The rotor wheel assembly rotates the horizontal rotatable revolving track 20 and it, in turn, rotates the power wheels 21.
5. At a predetermined speed, the load shedding mechanism 22 engages a first pump P and the pump starts working. Depending upon the wind speed, the rotor wheel assembly 11 may slow down a little or may still continue to accelerate.
6. In the situation where the rotor wheel assembly 11 continues to accelerate, a second pump P is engaged and starts working, and so on, until all the pumps are engaged.
7. The angle of air blades 12 are adjusted when all of the pumps P are loading and the rotor wheel assembly 11 still increases the speed. The microprocessor in the nacelle 18 maintains the speed of the rotor wheel assembly 11 within predetermined values.
8. The load shedding mechanism 22 engages and disengages the pumps P, depending upon the power produced by the rotor wheel assembly 11.
9. The pumps P lift the water and fill up an elevated upper tank.
10. When the upper tank is full or when it is desired to produce electricity, a valve connected between the upper tank and a water turbine is opened, releasing water from the upper tank to operate the water turbine.
11. The water turbine is coupled to a generator which produces electricity that is delivered through a transformer and switchgear.

The operation described above is presented for purposes of example only, and not limited thereto. It should be understood that the pumps in the above example may be replaced with air pumps, electrical generators, alternators, and combinations thereof.

While this invention has been described fully and completely with special emphasis upon preferred embodiments, it should be understood that within the scope of the appended claims the invention may be practiced otherwise than as specifically described herein.

The invention claimed is:

1. A wind turbine power generator for the generation of electricity, comprising:
    an elongate vertical support tower;
    support means including a yaw mechanism rotatably mounted on an upper portion of said tower and support arms extending horizontally outwardly therefrom to pivot about a vertical axis;
    circumferential arcuate bearing supports connected at an outer end of said support arms;
    a circular rotor wheel assembly formed of concentric inner and outer rings and angularly adjustable blades extending therebetween, said inner and outer rings rotatably supported by said arcuate bearing supports in a vertical plane to rotate about a horizontal axis;
    a horizontal rotatable revolving track disposed on said tower beneath said rotor wheel assembly to revolve around said tower; and said outer ring partially supported on the top of said horizontal rotatable revolving track;
    power wheels engaged with said revolving track to be rotatably driven thereby;
    power producing means connected with said power wheels to be driven thereby; and
    load shedding means connected between said power wheels and said power producing means for selectively engaging and disengaging said power wheels from said power producing means dependent upon available wind power to maintain rotation of said rotor wheel assembly.

2. The wind turbine power generator according to claim 1, wherein said power producing means is selected from the group consisting of electrical generators, hydraulic pumps, and pneumatic pumps, and combinations thereof.

3. The wind turbine power generator according to claim 1, wherein
said load shedding means is selected from the group consisting of a clutch mechanism, and a solenoid mechanism.

4. The wind turbine power generator according to claim 1, wherein
said circular rotor wheel assembly is formed of an inner ring, an outer ring, and at least one intermediate ring disposed in concentric spaced relation between said inner ring and said outer ring and angularly adjustable blades extending between said concentric spaced rings, said inner ring and said outer ring rotatably supported by said arcuate bearing supports in a vertical plane to rotate about a horizontal axis.

5. The wind turbine power generator according to claim 1, further comprising;
wind speed sensor means and pitch control means operatively connected with said angularly adjustable blades for changing the pitch angle of said blades relative to the sensed wind speed.

6. The wind turbine power generator according to claim 5, wherein
said wind speed sensor means comprises an anemometer and said pitch control means comprises at least one electrical motor for rotating said blade to change the pitch angle thereof.

7. The wind turbine power generator according to claim 1, wherein
each of said blades is pivotally supported between said concentric spaced rings by at extensible and retractable pitch control means for changing the pitch angle of said blades,
said extensible and retractable pitch control means being extensible to bias said blades to a maximum pitch angle when there is little or no wind, and retractable to reduce the pitch angle of said blades corresponding to the wind force.

8. The wind turbine power generator according to claim 7, wherein
said extensible and retractable pitch control means includes damping means for retracting rapidly to reduce the pitch angle of said blades responsive to an increasing wind force, and to increase the pitch angle of said blades slowly over time responsive to a decreasing wind force.

9. The wind turbine power generator according to claim 1, wherein
said circumferential arcuate bearing supports comprise arcuate segments radially spaced from said inner and outer rings and contain a plurality of circumferentially spaced sets of jaw bearings having bearing members that engage the circumference and lateral sides of said inner and outer rings to rotatably support said rings in a vertical plane.

10. A method for operating a wind turbine power generator to produce electricity, comprising:
providing a wind turbine power generator as recited in claim 1;
activating said yaw mechanism to rotate said rotor wheel to face the wind responsive to sensing the wind direction;
adjusting said angularly adjustable blades to a desired angle with respect to the wind speed and wind force;
allowing said rotor wheel assembly to rotate in a vertical plane about a horizontal axis so as to rotate said horizontal rotatable revolving track and it, in turn, to rotate said power wheels;
at a predetermined speed, activating said load shedding means to engage a first said power producing means;
upon continued acceleration of said rotor wheel assembly, activating said load shedding means to engage subsequent additional said power producing means;
adjusting said elliptical blades to a desired angle when a desired number of said power producing means are engaged to maintain the speed of said rotor wheel assembly within predetermined values; and
activating said load shedding means to engage and disengage said power producing means depending upon the power produced by said rotor wheel assembly.

* * * * *